United States Patent Office 2,697,729
Patented Dec. 21, 1954

2,697,729
PREPARATION OF KETONES FROM CARBOXYLIC ACIDS AND ESTERS THEREOF

John L. Ohlson and Charles W. Hoerr, Chicago, Ill., assignors to Swift & Company, Chicago, Ill., a corporation of Illinois No Drawing. Application April 22, 1952, Serial No. 283,763

15 Claims. (Cl. 260—586)

The present invention relates in general to the preparation of ketones by the liquid phase pyrolysis of carboxylic acids and esters and more particularly to the preparation of ketones by the liquid phase catalytic pyrolyzation of carboxylic acids and esters containing at least one hydrogen on the carbon alpha to the carboxyl group.

The increasing importance of ketones derived from carboxylic or fatty acids as solvents or waxes has given rise to a considerable amount of recent work in this field. In general, the most satisfactory prior art methods for the production of ketones involve vapor phase reactions using oxides or carbonates of metals as vapor phase catalysts. These methods require the use of fairly high operating temperatures and a relatively expensive catalyst resulting in an uneconomical process and generally in a process which does not give optimum yields of the desired ketones.

Therefore, it is an object of the present invention to provide a method of preparing ketones from carboxylic acids and esters thereof involving a liquid phase reaction whereby the above difficulties of the prior art are overcome.

It is a further object of this invention to provide a method for the liquid phase pyrolysis of carboxylic acids and esters thereof to ketones using a catalyst which is relatively inexpensive and easily regenerated.

Additional objects, if not specifically set forth herein, will be readily apparent to one skilled in the art from the following detailed description of the invention.

Broadly, the present invention comprises a process for the pyrolysis of carboxylic acids in the presence of an activated alumina catalyst wherein sufficient pressure is employed on the reacting system to maintain the carboxylic acid in the liquid phase within a temperature range of about 300°–400° C.

More specifically, the present invention contemplates the liquid phase pyrolysis of aliphatic, alicyclic, or aryl-substituted alkyl carboxylic acids and the methyl or ethyl esters thereof either singly or in admixture with one or more other acids selected from the above group or from the group consisting of aryl carboxylic acids and the methyl and ethyl esters thereof, provided the critical temperatures of the acids are above 300° C. Only carboxylic acids containing at least one hydrogen on the carbon alpha to the carboxyl group can be used by themselves in this process. Such acids usually have the following configuration:

(1)
$$R-\underset{H}{\overset{H}{C}}-\underset{}{\overset{O}{C}}-OH$$

Wherein R may be hydrogen or any organic hydrocarbon radical, hence including all aliphatic and aryl-substituted alkyl acids, (2) Acids such as illustrated below, wherein $R_1$ and $R_2$ may be the same or different organic radicals.

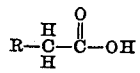

(3) Acids of the alicyclic group such as illustrated below, wherein R is a cycloaliphatic group having at least one hydrogen on the carbon alpha to the carboxyl group.

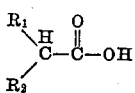

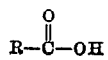

These acids, when used by themselves in the process of this invention, yield symmetrical ketones of the type:

If these acids are admixed before reacting, mixed ketones are obtained in which the organic radicals (R) differ.

It is apparent from the above that all aryl acids which consist of an aromatic radical attached directly to the carboxyl group are excluded. These acids do not contain the hydrogen atom on the carbon alpha to the carboxyl group and therefore do not, by themselves, form ketones when employed in the process of this invention.

However, the aryl acids may be admixed with any of the acids containing at least one hydrogen on the carbon atom alpha to the carboxyl group and reacted to give mixed ketones of the type:

wherein R and R' differ, R being of the group of aliphatic, alicyclic, or aryl-substituted radicals, while R' may be any organic hydrocarbon radical. It has been found, for example, that benzoic acid admixed with stearic acid may be reacted to yield appreciable quantities of stearophenone even though when reacted alone, in accordance with the method of the present invention, no ketone yield could be obtained from the benzoic acid.

While it is not intended to restrict in any respect the broad group of organic acids which may be converted to ketones by the present method and which are included under the generic terminology employed above, it is possible, for practical purposes, to more specifically state certain classes within such group which have been determined to be of considerable value. These subgeneric classes, as they may be called, include the aliphatic mono and dibasic acids, such as butyric, caprylic, lauric, myristic, stearic, sebacic, and the like; the cycloaliphatic acids, such as cyclohexane mono-carboxylic acids; aromatic-substituted aliphatic acids which contain a free alpha-hydrogen atom, such as phenyl acetic acid and napthalene acetic acid; mixtures of aromatic acids and any of the above acids which contain the free alpha-hydrogen atom, such as benzoic-stearic, o-phthalic-stearic, and o, m, p-phthalic-fatty acids; and esters of the above acids.

A temperature of about 300° C. is the lower limit of the operable temperature range within which the present invention may be successfully carried out. It has been found that at temperatures below 300° C. the decarboxylation of the acids employed is so slow as to be impractical, and further that when employing fatty acids having 3 or more carbon atoms, dicarboxylic acids, or the methyl and ethyl esters thereof, a conversion to the anhydride takes place at temperatures below 300° C., as described in the copending application of J. L. Ohlson and C. W. Hoerr, Serial No. 283,764, filed April 22, 1952, and entitled "Fatty Acid Anhydrides."

As previously indicated, the process is operable within the range of about 300° C. to about 400° C. The upper limit of 400° C. is critical in that it has been found that, when temperatures above 400° C. are employed, a predominance of hydrocarbon residue and alcohol-insoluble polymerized material is produced due to the thermal decomposition of the acids used.

The optimum temperature range for the process of the present invention has been found to be about 330°–360° C. for most of the acids.

In carrying out the process, atmospheric pressure is in general sufficient to maintain any acid in the aliphatic series having more than 12 carbon atoms in the liquid phase within the operable temperature limits. However, when an acid in the aliphatic series having less than 12 carbon atoms is processed, it is generally necessary to impose superatmospheric pressure on the system in order to maintain the reactants in the liquid phase.

The catalyst used in the present invention has been found to be far superior to all of the common metallic oxides both in the yield produced through its use and in its ease of regeneration. The method producing the best catalyst comprises heating aluminum oxide trihydrate (about 30 per cent water content) to approximately 500° C. for several hours, forming pellets from the monohydrate thus produced, the pellets being preferably of about ⅛–¼ inch in diameter, for the specified column used herein, and thereafter calcining the pellets at 600°–700° C. for a period of from 1 to 2 hours. It is essential that trihydrated alumina, obtained by acidifying an aqueous solution of sodium aluminate, be used in preparing this catalyst. No other method results in the formation of an "activated" alumina. In some instances a granular catalyst may be desired. A suitable granular "activated" alumina catalyst may be prepared by heating the granulated monohydrate, prepared as above, to 600°–700° C. for several hours. This granular catalyst will approximate the yield produced by the use of the preferred pelleted catalyst.

As mentioned previously, one of the chief advantages of the "activated" alumina catalyst, other than the increased yield produced by the use thereof, is its ease of regeneration. When used in a heated, packed column, as hereinafter described, the alumina catalyst continuously dehydrates itself as long as the temperature of the column remains elevated. Should the catalyst become too highly hydrated to function efficiently due to a drop in the operating temperature or to too rapid a throughput of the acid, it can be readily dehydrated by maintaining the column temperature in the neighborhood of 350° C. for 2 to 4 hours. A further advantage of the catalyst used in the method of this invention is that it is very stable, only a negligible amount (0.05%) or less appearing in the product, thereby eliminating the necessity of subsequent treatment of the product to remove the catalyst therefrom.

The present invention may be carried out in several ways, for example, in a continuous manner utilizing a column, packed with unsupported "activated" alumina, operating under either atmospheric pressure or superatmospheric pressure depending on the number of carbon atoms present in the acid being processed, or in a batch process utilizing the same catalyst in an autoclave or other container which may or may not be pressurized depending upon the acid being processed. The present invention requires that at least one of the acids being reacted contains at least one hydrogen on the carbon atom alpha to the carboxyl group, that the system be under sufficient pressure to maintain the reactants in the liquid phase, that the temperature of reaction be within the range of about 300°–400° C. and preferably within the range of about 330°–360° C., and that the "activated" alumina catalyst described above be present.

A brief description of the procedure preferably followed when using a packed column for continuous production of ketones according to the method of the present invention is set forth below. The batch process which may be carried out in an autoclave or the like will be readily ascertainable to one skilled in the art from the description of the continuous process.

A molten carboxylic acid of the type described above or a mixture thereof is introduced into the top of a heated column of conventional design packed with unsupported pelleted or granulated "activated" alumina ($Al_2O_3$). The temperature of the column is kept within the range of 300°–400° C., with the optimum temperature range being in the neighborhood of 330°–360° C. for most acids as discussed below. The rate of throughput of the acid or mixture of acids is regulated so that any given portion of acid is in contact with an excess of catalyst, the rate for a column containing 500 grams of catalyst being, for example, about 100–200 grams of carboxylic acid per hour. The ketone produced by the pyrolysis of the carboxylic acid is recovered from the base of the column, the conversion being, in general, between 80–90 per cent of theoretical, although in some instances conversions up to 92–94 per cent have been recorded. The column may be heated by any suitable means, but an electric heating jacket has been found to be very suitable for this purpose.

The following specific examples are set forth for the purpose of illustration only to illustrate in detail the actual carrying out of the present invention:

*Example I*

Two hundred grams of commercial stearic acid were run through a four-foot column of 8–50 mesh, granulated, "activated" alumina catalyst under atmospheric pressure and at a rate of about 50 grams per hour. The temperature of the column was operated under a gradient ranging from 335° C. at the top to 350° C. at the bottom. The product collected under these conditions comprised 78.3 per cent ketone melting at 83°–87° C.

*Example II*

Five hundred grams of hydrogenated tallow fatty acids were run through a four-foot column of ⅛ inch diameter pellets of "activated" alumina catalyst under atmospheric pressure and at the rate of about 100 grams per hour. The temperature of the column was maintained at 355° C. The product collected under these conditions comprised 82.8 per cent ketone.

*Example III*

Two hundred grams of hydrogenated menhaden fatty acids were run through a four-foot column of ⅛ inch diameter pellets of "activated" alumina catalyst under atmospheric pressure and at the rate of about 100 grams per hour. The temperature of the column was held at 345° C. The conversion in this case was to 81.5 per cent ketone.

*Example IV*

Nine hundred eight grams of lauric acid were run through an eight-foot column of ⅛ inch diameter pellets of "activated" alumina catalyst under atmospheric pressure and at a rate of about 2 pounds per hour. The temperature of the column was maintained at 330° C. The product collected under these conditions comprised 85.4 per cent ketone.

*Example V*

Nine hundred eight grams of lauric acid were run under the conditions of Example IV, except that the rate of throughput was decreased to about 1 pound per hour. The conversion to ketone in this case was 94.3 per cent.

*Example VI*

Two pounds of lauric acid were run through an eight-foot column of ⅛ inch diameter pellets of "activated" alumina catalyst under atmospheric pressure and at the rate of ½ pound per hour. The temperature of the column was maintained at 340° C. The product collected under these conditions comprised 90.1 per cent ketone.

*Example VII*

Two hundred grams of commercial stearic acid were run through a four-foot column of 50–200 mesh, granulated "activated" alumina catalyst at a rate of 200 grams per hour. The temperature of the column was held at 375° C. Vacuum equivalent to about 150 mm. of mercury was applied to the receiver. The conversion of the fatty acid to ketone was 92.5 per cent.

*Example VIII*

Two hundred grams of commercial stearic acid were run through a four-foot column of 10 mesh, granulated "activated" alumina catalyst at the rate of 200 grams per hour. The temperature of the column was held at 350° C. Vacuum equivalent to about 150 mm. of mercury was applied to the receiver. The product collected under these conditions comprised 86.0 per cent ketone.

*Example IX*

One hundred fifty grams of lauric acid and 300 grams of ⅛ inch diameter pellets of "activated" alumina catalyst were heated in a closed system for 2 hours at 330° C. with agitation. About 50 pounds per square inch pressure was developed by the reaction. The yield of ketone was 83.9 per cent.

*Example X*

Three hundred grams of caprylic acid and 200 grams of ⅛ inch pellets of "activated" alumina catalyst were heated in a closed system for 2¼ hours at 350° C. with agitation. The resultant product consisted of 85 per cent ketone boiling at 148°–155° C. under 8–9 mm. pressure.

*Example XI*

One hundred grams of methyl stearate were contacted with 150 grams of ⅛ inch pellets of "activated" alumina catalyst for 5 hours at 350° C. at atmospheric pressure. The product contained 52 per cent ketone.

Example XII

Thirty grams of benzoic acid and 70 grams of stearic acid were heated in a closed system at 350° C. with 200 grams of ⅛ inch pellets of "activated" alumina catalyst for 4½ hours. The product was then recrystallized from alcohol. About 30 per cent of the product consisted of stearophenone melting at 63°–64° C. About 45 per cent of the product consisted of stearone melting at 85.°–86° C.

Example XIII

Fifty grams of benzoic acid and 50 grams of myristic acid were contacted with 100 grams of pelleted "activated" alumina for 3½ hours at 330° C. in a pressure bomb. The product was distilled off to leave a brick-red residue. Analysis showed 78 per cent ketone.

Example XIV

Twenty-five grams of o-phthalic acid and 75 grams of stearic acid were contacted with 200 grams of pelleted "activated" alumina catalyst for 4 hours at 330°–340° C. in a pressure bomb. The product contained 82 per cent ketone.

Example XV

Seventy-five grams of methyl benzoate and 72 grams of stearic acid were contacted with 125 grams of pelleted "activated" alumina catalyst for 6 hours at 330°–340° C. in a pressure bomb. The product contained 60 per cent mixed phenyl heptadecyl ketone.

Example XVI

Butyric acid (23.5 grams) and stearic acid (75 grams) were heated in a closed system with 200 grams of ⅛ inch pellets of "activated" alumina at 350° C. for 2½ hours with agitation. The product consisted of about 30 per cent of a ketone melting at 55°–56° C., and another 33 per cent of stearone melting at 85°–86° C.

Example XVII

Fifty grams of cyclohexane mono-carboxylic acid and 75 grams of ⅛ inch diameter pellet of "activated" alumina catalyst were heated in a closed system for 2 hours at 330° C. with agitation. The conversion to ketone was 52 per cent.

Example XVIII

Seventy-five grams of phenylacetic acid and 100 grams of ⅛ inch diameter pellets of "activated" alumina were heated in a closed system for 2 hours at 325° C. with agitation. The conversion to ketone was 43 per cent.

Example XIX

Seventy-five grams of sebacic acid and 150 grams of ⅛ inch diameter pellets of "activated" alumina catalyst were heated to 340°–345° C. with agitation. Sudden polymerization occurred after about 1 hour of heating. The product gave a free acid value which indicated polymerization had occurred to give a compound containing 4 carbonyl groups and 2 carboxy groups. This experiment was repeated at several temperatures within the range 300°–400° C., and a product was obtained which by analysis indicated the formation of polyketonic acids.

A necessary condition imposed on the acids used in this process is that they have a critical temperature above 300° C. as aforesaid. This, of course, is necessary in order that the acids will remain in the liquid phase during contact with the activated alumina catalyst at the operating temperatures of the process. The operating temperature, although optimum for most acids at 330°–360° C., must be adjusted so as to be at least a degree or two below the critical temperatures of the acids being processed. For example, when using acetic acid, the operating temperature should be slightly below the critical temperature of 322° C.

By the term "activated" alumina catalyst as appearing in the appended claims is meant the catalyst as prepared in the manner hereinbefore described, i. e., by heating, pelleting, and calcining trihydrated alumina, obtained by acidifying an aqueous solution of sodium aluminate.

Obviously, many modifications and variations of the invention as hereinbefore set forth may be made without departing from the spirit and scope thereof, and therefore only such limitations should be imposed as are indicated in the appended claims.

We claim:

1. A method for the preparation of ketones which consists of contacting an "activated" alumina catalyst with a carboxylic acid reactant, said reactant containing as an essential component at least one member selected from the group consisting of carboxylic acids having at least one hydrogen on the carbon alpha to the carboxyl group, the methyl and ethyl esters of such acids, and mixtures thereof, in the liquid phase at a temperature within the range of about 300° C. to about 400° C.

2. A method as in claim 1 wherein said essential component is selected from the group consisting of aliphatic mono- and di-basic acids, the methyl and ethyl esters of such acids, and mixtures thereof.

3. A method as in claim 1 wherein the reactant is a mixture of carboxylic acids, at least one of which is a carboxylic acid containing at least one hydrogen on the carbon alpha to the carboxyl group, and at least one of which is an aryl carboxylic acid having a carboxyl group attached directly to an aromatic nucleus.

4. A method as in claim 1 wherein said essential component consists of a compound selected from the group consisting of the cycloaliphatic acids, the methyl and ethyl esters of such acids, and mixtures thereof.

5. A method as in claim 1 wherein said essential component is an aromatic substituted aliphatic acid containing an alpha-hydrogen atom.

6. A method for the preparation of ketones which consists of pyrolyzing a reactant selected from the group consisting of carboxylic acids containing at least one hydrogen on the carbon alpha to the carboxyl group and the methyl and ethyl esters thereof, in a liquid phase in contact with an "activated" alumina catalyst at a temperature between about 300° C. and about 400° C.

7. A method as in claim 6 wherein the temperature is from about 330° C. to about 360° C.

8. A method for the preparation of ketones which consists of mixing at least one reactant selected from the group consisting of carboxylic acids containing at least one hydrogen on the carbon alpha to the carboxyl group and the methyl and ethyl esters thereof, with at least one reactant selected from the group consisting of aryl carboxylic acids and the methyl and ethyl esters thereof, and pyrolyzing said mixture in the liquid phase in the presence of an "activated" alumina catalyst at a temperature within the range of about 300° C. to about 400° C.

9. A method as in claim 8 wherein the temperature range is from about 330° C. to about 360° C.

10. A method for the preparation of a ketone which consists of contacting an "activated" alumina catalyst with a carboxylic acid reactant, said reactant containing as an essential component at least one member selected from the group consisting of carboxylic acids having at least one hydrogen on the carbon alpha to the carboxyl group, the methyl and ethyl esters of such acids, and mixtures thereof, at a temperature within the range of about 330° C. to about 360° C. and under sufficient pressure to maintain the reactant in the liquid phase.

11. A method as in claim 10 wherein said essential component is selected from the group consisting of aliphatic mono- and di-basic acids, the methyl and ethyl esters of such acids, and mixtures thereof.

12. A method as in claim 10 wherein the reactant consists of a mixture of carboxylic acids, at least one of which is a carboxylic acid containing at least one hydrogen on the carbon alpha to the carboxyl group, and at least one of which is an aryl carboxylic acid having a carboxyl group attached directly to an aromatic nucleus.

13. A method as in claim 10 wherein said essential component consists of a compound selected from the group consisting of the cycloaliphatic acids, the methyl and ethyl esters of such acids, and mixtures thereof.

14. A method as in claim 10 wherein said essential component is an aromatic substituted aliphatic acid containing an alpha-hydrogen atom.

15. A method for the preparation of ketones which consists of contacting an "activated" alumina catalyst with a carboxylic acid reactant containing as an essential component at least one member of the group consisting of carboxylic acids having at least one hydrogen on the carbon alpha to the carboxyl group, the methyl and ethyl esters of such acids, and mixtures thereof, said essential component being selected from the group consisting of aliphatic mono- and di-basic acids, cycloaliphatic acids, aromatic-substituted aliphatic acids containing an alpha-hydrogen atom, the methyl and ethyl esters of such acids, and mixtures thereof, in the liquid phase at a temperature within the range of about 300° C. to about 400° C.

References Cited in the file of this patent

UNITED STATES PATENTS

| Number | Name | Date |
|---|---|---|
| 1,989,325 | Lommel | Jan. 29, 1935 |

FOREIGN PATENTS

| Number | Country | Date |
|---|---|---|
| 295,657 | Germany | Dec. 12, 1916 |
| 615,543 | Great Britain | Jan. 15, 1946 |

OTHER REFERENCES

Grun et al., Chem. Abstracts, vol. 20 (1926), cols. 2818–2819.